Feb. 3, 1925.  1,524,847
L. T. THORN
CITY LICENSE AND IDENTIFICATION CARD HOLDER FOR MOTOR VEHICLES
Filed April 27, 1923
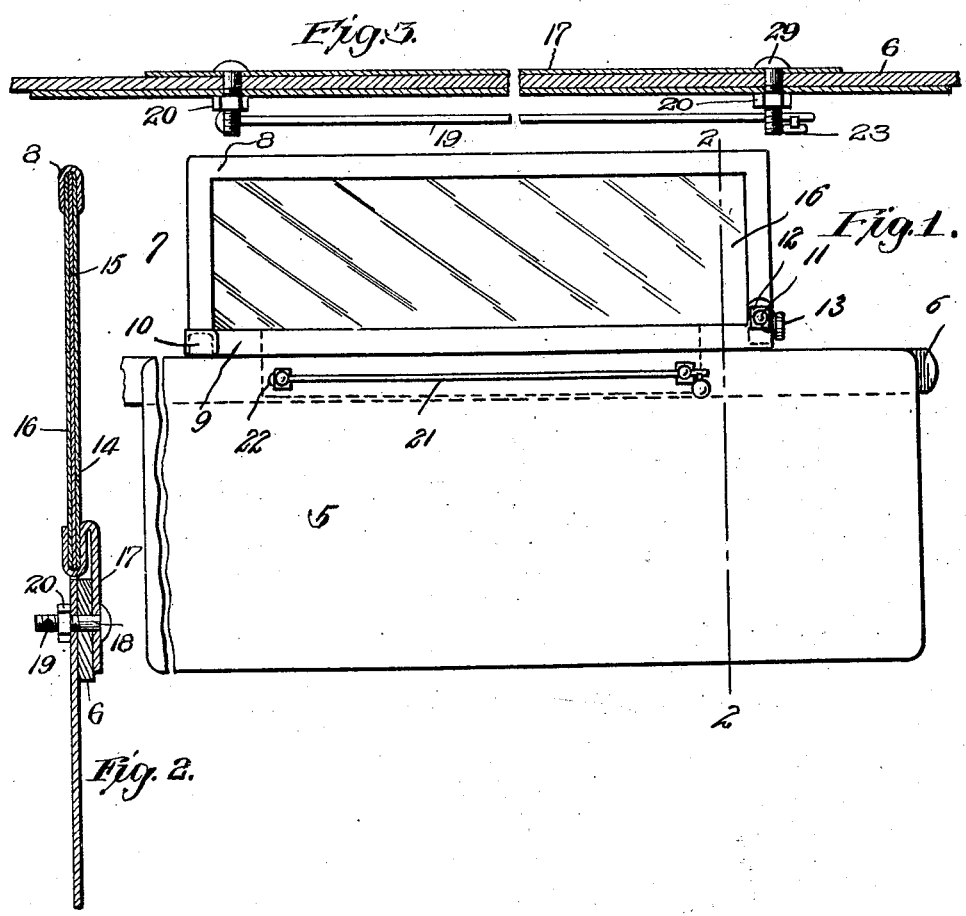

Patented Feb. 3, 1925.

1,524,847

UNITED STATES PATENT OFFICE.

LAWRENCE T. THORN, OF HARRISBURG, ARKANSAS.

CITY LICENSE AND IDENTIFICATION CARD HOLDER FOR MOTOR VEHICLES.

Application filed April 27, 1923. Serial No. 634,939.

*To all whom it may concern:*

Be it known that LAWRENCE T. THORN, a citizen of the United States, residing at Harrisburg, in the county of Poinsett and State of Arkansas, has invented certain new and useful Improvements in City License and Identification Card Holders for Motor Vehicles, of which the following is a specification.

In carrying out the present invention it is my purpose to provide an improved holder for the usual city license plates and identification cards of motor vehicles primarily but not specifically adapted to be employed in conjunction with the license plate holder shown and described in my copending application, Serial No. 628,111, filed March 27, 1923, it of course being understood that the present holder may be equally as well employed in conjunction with the well known form of license plate now issued by all States.

A further purpose of this invention resides in the provision of such a holder that may be readily disassembled for receiving the city license plate and identification card, the device when assembled being preferably maintained in this position through the medium of a seal for considerably lessening the liability of any one tampering with the tag or identification card in the event of the vehicle being stolen.

A still further purpose of the invention resides in the provision of such a holder that is equipped with a means for expeditiously attaching the same to the usual license tags of vehicles or the license plate holder shown in the above set forth application and in which a seal placed on the securing means for the license tag, and the license plate holder, also mounts the identification card holder for preventing disassemblage thereof, for removal of the identification card without breaking the seal on the securing means.

A still further purpose of this invention is to provide such a holder that is comparatively simple of construction and one that embraces at the same time the desired features of efficiency and durability and one that may be manufactured and marketed at small cost.

The nature and advantages of the invention will be better understood when the following detailed description is read in connection with the accompanying drawings, the invention residing in the construction, combination, and arrangement of parts as claimed.

In the drawings forming part of this specification, like numerals of reference indicate similar parts in the several views, and wherein:

Figure 1 is a front elevation of my improved holder shown as associated with a well known form of State license tag;

Figure 2 is a detail vertical cross section taken substantially upon the line 2—2 of Figure 1;

Figure 3 is a longitudinal cross section thereof.

First having reference to Figures 1 to 3, inclusive, 5 designates the well known type of State license tag and 6 the usual supporting bracket therefor, these elements, however, not being of the essence of the present invention but merely shown for more adequately showing the relationship of my invention thereto.

My city license tag and identification card holder designated generally by 7 comprises a substantially rectangular inverted U-shaped channel frame 8 and a removable channel securing strip 9 adapted for positioning over the open side of said frame and having interlocking connection 10 at one end with one side of said inverted U-shaped frame that is similar in all respects to the interlocking connection between the securing strip 15 and the adjacent end of the vertical leg 12 of the frame 11 of the above mentioned pending application. The interlocking connection 10 is formed by providing extensions on the vertical leg of the U-frame 8, extended outwardly and upwardly along the outer sides of the leg, in spaced relation thereto, for receiving the slotted end portion of the strip 9, which is also provided with return extensions on the outer side, for overlying the extensions on the vertical leg of frame 8. It will thus be seen that the interlocking connection is of such a character that it is necessary to move the channel strip a substantial distance along the portion of the frame 8, after a pivotal movement of the strip, in order to disconnect the strip from the frame, for the purpose of removing the city license card or identification tag therefrom. The other end of this strip 9 is secured to the opposite end of said frame 8 through the medium of a bolt 11 upon which is threaded a nut 12 and engaging through an opening in this bolt beyond said nut 12 is a suitable form of seal 13 for preventing the detachment of the strip 9 from the frame 8 without breaking said seal 13.

As more clearly shown in Figure 2, the present holder carries an identification card 14, a city license tag 15 and a sheet of transparent material, preferably celluloid 16 for permitting said city license tag to be viewed.

The inner side of the retaining strip 9 is formed with a pendant plate 17 of a lesser length than the frame and provided adjacent its opposite ends with openings 18 adapted for alinement with the usual openings in the said license tag 5 and the bracket 6 for permitting of the passage therethrough of screw-threaded and headed bolts 19. In engagement upon these bolts are nuts 20 and extending through alined openings within the projecting ends of said bolts is a screw rod 21, one end of the same being headed at 22 while the opposite end is provided with a slot for receiving a desirable form of seal 23 for effectively preventing the removal of said rod 21 and a consequent detachment of the holder 7 from the tag 5 without breaking said seal.

In assembled relation, it will be noted that the bottom of the strip 9 seats on the upper edge of the bracket 6, and license tag 5, so that when the rod 21 is sealed for sealing the mounting of the tag, so that tampering may be detected, the seals 23 of rod 21 also serve to prevent the removal of strip 9 from the U-frame and thereby effectively prevent removal of the identification card, without mutilating the frame or removing the seal 23, rod 21, and bolts 19.

In view of the above description it is believed by me that the purposes and advantages of a holder as shown and described will be readily appreciated by those skilled in the art and although I have herein shown and described the preferred embodiment of the present invention, it is nevertheless to be understood that minor changes may be made therein, without departing from the spirit and scope of the invention as claimed.

Having thus described my invention, what I claim as new and desire to secure by Letters Patent is:

1. In combination with a license tag for vehicles, and a securing bracket therefor, a city license tag and identification card holder provided with a removable section for permitting the insertion or removal of an identification card, and means for securing the city license tag and identification card holder to said license tag and bracket, said means preventing the removal of the identification card from the holder.

2. In combination with a license tag for vehicles, and a securing bracket therefor, an identification card holder having a frame provided with a removable strip for permitting the insertion and removal of an identification card, and means for securing the identification card holder to the license tag and bracket with the strip and portions of the remaining frame in substantial contact with the license tag and bracket, whereby the removal of the strip from the frame for removing the identification card is prevented.

3. In combination with a license tag for vehicles, and a securing bracket therefor, an identification card holder formed of a frame having a removable strip provided with a pendant plate at one side thereof, and means for securing the pendant plate to the license tag and bracket with the strip and frame seating on the upper edge of the license tag and bracket, whereby removal of the identification card from the holder is prevented when the pendant plate, tag, and holder are assembled.

4. In combination with a license tag for vehicles, and a securing bracket therefor, an identification card holder having a removable portion to permit the insertion and removal of an identification card, and sealing and securing means for mounting the identification card holder and license tag on the bracket for preventing removal of the holder portion and identification tag from the holder in sealed relation.

In testimony whereof I affix my signature.

LAWRENCE T. THORN.